United States Patent Office 3,535,291
Patented Oct. 20, 1970

3,535,291
HEAT-CURABLE COPOLYMERS OF ALKENYL-OXAZOLINES AND UNSATURATED CARBOXYLIC ACIDS
Franz Riemhofer and Wolfgang Seeliger, Marl, Germany, assignors, by mesne assignments, to Chemetron Corporation, Chicago, Ill., a corporation of Delaware
No Drawing. Filed Dec. 12, 1967, Ser. No. 689,760
Claims priority, application Germany, Dec. 24, 1966, C 41,060
Int. Cl. C08d *15/00, 19/00*
U.S. Cl. 260—78.5      8 Claims

ABSTRACT OF THE DISCLOSURE

Free-radical polymerizates of 2-alkenyl-$\Delta^2$-oxazolines with $\alpha,\beta$-unsaturated carboxylic acid in the presence of amine are solvent soluble and are cured at temperatures from 100° to 200° C. to cross-linked lustrous films having good mechanical properties and excellent solvent resistance.

This invention relates to cross-linked polymers of 2-alkenyl-$\Delta^2$-oxazolines and $\alpha,\beta$-unsaturated carboxylic acids.

BACKGROUND OF THE INVENTION

It is known that hard, clear, colorless, lustrous coatings having but poor solvent resistance can be prepared by subjecting to free radical polymerization 4,4-dialkyl-$\Delta^2$-oxazoline substituted in the 2-position by an alkenyl residue (particularly by a vinyl or isopropenyl residue) either alone or with other polymerizable olefinically unsaturated compounds. (See German Pat. 1,067,437; U.S. Pats. 2,831,858 and 2,897,182, French Pats. 1,367,518 and 1,385,727.)

The oxazoline ring moreover is known to be unstable with respect to acids at elevated temperatures (J. Org. Chem., 15, 802 [1950]), the ring being split at the oxygen bridge, normally leading to N-alkyl-carboxylic acid amides substituted in the $\beta$-position of the alkyl residue. Under the effect of aqueous mineral acids, N-($\beta$-hydroxyalkyl)-carboxylic acid amides are formed; and under the effect of carboxylic acids, N-($\beta$-acyloxyalkyl)-carboxylic acid amides are produced.

According to German published application 1,050,540, the reaction of bisoxazolines with dicarboxylic acids has already been utilized for the preparation of high molecular weight linear polycondensates containing carboxylic acid ester and carboxylic acid amide groups. Though the resultant products are suitable for the production of fibers and foils, the process must be conducted with the exclusion of water at high, polyamide-forming temperatures.

SUMMARY OF THE PRESENT INVENTION

An object of this invention is to provide improved polymers of 2-alkenyl-$\Delta^2$-oxazolines.

Another object is to provide cross-linked lustrous film having good mechanical properties and excellent solvent resistance.

Upon further study of the specification and claims, other object and advantages of the present invention will become apparent.

To attain these objects it has been discovered that solvent resistant coatings of a high quality can be readily produced by copolymerizing 2-alkenyl-$\Delta^2$-oxazolines with $\alpha,\beta$-unsaturated carboxylic acids [and with or without other ethylenically unsaturated compounds (subject to free radical polymerization)] in the presence of ammonia or amine and curing the resulting copolymerizate by heating.

DETAILED DISCUSSION OF THE INVENTION

The copolymerization reaction is a free radical polymerization initiated by a free radical catalyst. Exemplary catalysts are of the azo type. These are compounds in which the —N=N— group is attached to aliphatic carbons, at least one of which is a tertiary carbon atom. One of the carbon atoms bonded to the tertiary carbon atom has its remaining valences satisfied by either oxygen or nitrogen. Typical catalysts are azodiisobutyronitrile, azodiisobutyramide, dimethyl-, diethyl- or dibutylazodiisobutyrate, azobis-($\alpha,\gamma$ - dimethylvaleronitrile, azobis - ($\alpha$-methylbutyronitrile), azobis-($\alpha$-methylvaleronitrile), and dimethyl- or diethylazobismethylvalerate. One or a mixture of catalysts may be used in amounts of from about 0.05% to about 5% based on the weight of total monomer.

Suitable 2-alkenyl-$\Delta^2$-oxazolines are, in particular, the 2-vinyl- and 2-[1'-(lower)alkyl]-vinyl derivatives wherein the alkyl group contains 1 to 4 carbon atoms, preferably, the 2-vinyl-, 2-isopropenyl-, and 2-(but-1'-en-2'-yl)-$\Delta^2$-oxazolines are employed. Compounds of this type are satisfactorily free radical polymerized. The production of such monomers is described in Angew. Chem. 78, 913 (1966) especially page 921 by W. Seeliger et al.

Although these oxazolines are preferably unsubstituted in the 4- and 5-positions, substitution in such positions is not detrimental. In the 4-position, e.g., can be from one to two lower alkyl groups having, independently, from 1 to 4 carbon atoms or a polymethylene chain of either 4 or 5 carbons.

Generally suitable $\alpha,\beta$-unsaturated carboxylic acids are those of 3–6 carbon atoms, preferably aliphatic carboxylic acids, the most well known being acrylic acid and the substitution products thereof, such as methacrylic acid and crotonic acid. Suitable also are $\alpha,\beta$-unsaturated dicarboxylic acids, such as fumaric acid, maleic acid, itaconic acid and citraconic acid, as well as the lower alkyl monoesters of said dicarboxylic acids, e.g. monomethylester and monoethylester. Preferably, acrylic acid and methacrylic acid are employed. Ethylenically unsaturated comonomers may be concomitantly used.

Exemplary of such comonomers are acrylates, such as lower alkyl acrylates, e.g. ethyl acrylate; methacrylates, such as lower alkyl methacrylates, e.g. methylmethacrylate; and styrene.

The amine is primary, e.g. methylamine; secondary, e.g. dimethylamine; or tertiary, e.g. triethylamine. It is aliphatic, e.g. dimethylaminoethanol, n-butylamine and diethylamine; cycloaliphatic, e.g. cyclohexylamine; heterocyclic, e.g. piperidine, morpholine, n-ethylpiperidine, N-ethylmorpholine and pyridine; araliphatic, e.g. benzylamine; or aromatic, e.g. N-methylaniline, N,N-dimethylaniline and aniline.

Volatile tertiary amines, the basicity of which is higher than that of the oxazoline ring, are preferably employed; particularly suitable is triethylamine. However, amines of a lower basicity, which are not completely substituted on the amino nitrogen also yield good results. All used amines must be volatile.

The composition of the copolymer is normally selected so that the polymer contains equivalent amounts of oxazoline rings and carboxyl groups; however, an excess of one of the two components is not damaging. Basically, it is possible to copolymerize 2-alkenyl-$\Delta^2$-oxazolines into products in any desired quantity; however, incorporation of from 5 to 15% by weight of oxazoline and at least the equivalent amount of carboxylic acid into the copolymer is sufficient to yield the desired degree of cross-linking in the subsequently cured product. The incorporation of these amounts by copolymerization thus represents a preferred embodiment of the invention. The composition of the polymers is furthermore adjusted so that, by suitably combining plasticizing and hardening comonomers, the obtained properties are optimal for the contemplated use.

The copolymerization reaction can be bulk or solution, in nonpolar, e.g. xylene, or polar, e.g. isopropanol, solvents; the thus-obtained polymerizates can be dissolved in any desired solvent, or can be diluted with any desired solvent, insofar as the same is miscible with the original solvent. Suitable solvents are the customary varnish solvents, but the polymerization can also be conducted in alcohols, e.g. isopropanol, ethyl glycol (ethylene glycol monoethyl ether) and butyl glycol (ethylene glycol monobutyl ether), thus obtaining polymer solutions which can be diluted with water at any proportion. Such aqueous systems are preferred because of safety considerations (no danger of burning and explosion, reduced toxicity) and the reduction in objectionable odor. The copolymerization in a water-miscible solvent, therefore, represents a preferred embodiment of the process of this invention.

The amine is normally added in an amount equivalent to the carboxyl groups, but this is not absolutely necessary. Even with lower amounts of amine, soluble non-cross-linked products are obtainable without difficulty. An excess of the amine is harmless in any event, since it does not inhibit the polymerization, does not impair the properties of the thus-obtained product, and does not interfere, either, with the subsequent curing process.

Typical initial polymerization media preferably contain approximately, from 2 to 20 percent of the oxazoline, from 1.5 to 15 percent of the unsaturated acid, from 0 to 85 percent of ethylenically unsaturated comonomer, from 0.5 to 5 percent of catalyst, from 0 to 50 percent solvent and from 1.5 to 20 percent ammonia or amine, all percentages being by weight. The reaction temperatures and pressures are generally about 60 to 100° C. and 1 to 1.5 atmospheres absolute, preferably 70 to 80° C. at 1 atmosphere absolute. The reaction time is generally about 0.5 to 20, preferably 2 to 15 hours.

The copolymerizates produced in accordance with this invention have a long shelf life, as such or in dilution with conventional varnish solvents or with water, at room temperature and at moderately elevated temperatures, e.g. 40° C., in sealed containers, without the occurrence of premature gelling or undesired increase in viscosity. The shelf life generally ranges from 1 to 6 months, depending on temperature.

In general, during the polymerization no curing reaction between the oxazoline-rings and the carboxylic groups occurs; therefore it is possible to obtain long-chains of linear polymers. However, the quality of the obtained products is not impaired, when there was a minor reaction between oxazoline-rings and carboxylic groups during the polymerization. Nevertheless it is preferred for no cross-linking to take place.

In order to produce coatings, the solutions of the polymerizates, pigmented if desired, are applied to the articles to be coated and baked into them at temperatures of preferably 100° to 200° C. for preferably 15 to 60 minutes, the cross-linking reaction taking place between the oxazoline rings and the carboxyl groups. The resulting lustrous films exhibit very good mechanical properties; they are hard and, at the same time, elastic; they adhere very well to the substrate and exhibit excellent resistance to polar and non-polar solvents. The aqueous polymer solutions are also suitable for electro coating processes.

A most surprising result is effected by this invention. If the monomer mixture is polymerized in the absence of ammonia or amine, cross-linking takes place during polymerization. This is undesired at this point; insoluble products which are not useful for protective coatings are obtained. This cross-linking reaction is prevented by ammonia or amine at the employed temperature; polymerization in the presence of ammonia or amine results in linear polymerizates. Moreover, the amine (or ammonia) prevents premature cross-linking during storage of the polymerizates, thus effecting a sufficient storage stability of the coating composition without inhibiting, on the other hand, the desired cross-linking process occurring during the baking (curing) step.

Preferred substrates for the coating composition include, but are not limited to: metals, especially automobile bodies, refrigerators, washing machines, etc.

(Though German published application, 1,223,088 shows that it is possible to prevent, by the addition of tertiary amines, a premature reaction between the carboxyl groups of an oil-modified alkyd resin and the epoxide groups of an epoxidized fatty oil, such a teaching is not pertinent to the present invention which relates to a reaction of oxazoline rings, not epoxide groups.)

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

In the following examples, all parts and percentages are by weight and all temperatures are in degrees centigrade.

EXAMPLE 1

Heat a mixture of 100 parts of xylene, 86 parts of butanol, 14 parts of triethylamine, 100 parts of methyl methacrylate, 75 parts of butyl acrylate, 15 parts of 2-isopropenyl-$\Delta^2$-oxazoline, 10 parts of acrylic acid and 2 parts of azodiisobutyric acid nitrile for 6 hours at 75° under a nitrogen atmosphere to obtain a clear solution:

Conversion: 97.5%
Viscosity of the 30% solution: 176 centipoises
Nitrogen content: 1.32%.

Admix 200 parts of this clear polymer solution with 60 parts of titanium dioxide and 140 parts of a 1:1 xylene-butanol mixture to obtain a varnish. Apply the varnish to glass plates and sheet metal plates and bake the thus-varnished plates for 30 minutes at 130° and 180°, respectively. The thus-produced films exhibit very good resistance to acetone, xylene, a gasoline-benzene mixture and water; they adhere well to the substrate and have a pendulum hardness (according to König) at a layer thickness of 30 to 40 $\mu$, of 157 and 159 seconds, respectively, as well as a depression (cupping) [according to Erichsen] of 8.5 and 6.5 mm., respectively.

Replacing the 2 - isopropenyl - $\Delta^2$ - oxazoline with an equivalent of either 2-vinyl-$\Delta^2$-oxazoline or 2-(but-1'-en-2'-yl)-$\Delta^2$-oxazoline results, in a similar manner, in linear polymerizates and cured films having comparable properties.

Comparative Example I

Heat a mixture of 100 parts of xylene, 100 parts of butanol, 100 parts of methyl methacrylate, 75 parts of butyl acrylate, 15 parts of 2-isopropenyl-$\Delta^2$-oxazoline, 10 parts of acrylic acid and 2 parts of azodiisobutyric acid nitrile at 75° under a nitrogen atmosphere. After only 2.5 hours, the reaction mixture is viscous and insoluble in all solvents; cross-linking occurring during this brief polymerization.

EXAMPLE 2

Heat a mixture of 183.5 parts of methyl methacrylate, 10 parts of 2-isopropenyl-$\Delta^2$-oxazoline, 6.5 parts of acrylic acid, 9.1 parts of triethylamine and 10 parts of azodiisobutyric acid nitrile for 0.5 hour at 75° under a nitrogen atmosphere, and then cool the polymerizate rapidly to room temperature (20°). The thus-obtained solid polymer is soluble in acetone, isopropanol or an isopropanol-water mixture. By application and baking of the resulting varnishes, lustrous films having a very good resistance to solvents and a high pendulum hardness are obtained.

Replacing the 2-isopropenyl-$\Delta^2$-oxazoline with an equivalent of either 2-isopropenyl-4-methyl-$\Delta^2$-oxazoline or 2-isopropenyl-4,4-dimethyl-$\Delta^2$-oxazoline results, in similar manner, in linear polymerizates and cured films having comparable properties.

Comparative Example II

Heat the same mixture, but without triethylamine, at 75° under a nitrogen atmosphere. A product results which is insoluble in all solvents.

EXAMPLE 3

Heat a mixture of 155 parts of isopropanol, 55 parts of triethylamine, 55 parts of 2-isopropenyl-$\Delta^2$-oxazoline, 35 parts of acrylic acid and 2 parts of azodiisobutyric acid acid nitrile for 4 hours at 75° under a nitrogen atmosphere, whereby a conversion of 79% is obtained.

Dilute the thus-produced clear polymer solution with water or benzene. Bake nonpigmented films of the thus-diluted solution at 130° or 180° to prepare films which are insoluble in all solvents.

Replacing the 2 - isopropenyl - $\Delta^2$ - oxazoline with an equivalent of either 2-isopropenyl-4-ethyl-4-methyl-$\Delta^2$-oxazoline or 2-vinyl-4-methyl - 4 - (1'-methyl)propyl-$\Delta^2$-oxazoline results, in similar manner, in linear polymerizates and cured films having comparable properties.

Comparative Example III

Heat a mixture of 210 parts of isopropanol, 55 parts of 2-isopropenyl-$\Delta^2$-oxazoline, 35 parts of acrylic acid and 2 parts of azodiisobutyric acid nitrile at 75° under nitrogen. After 2 hours the reaction mixture is thick (viscous) and insoluble in all solvents; cross-linking has occurred during the polymerization.

EXAMPLE 4

Heat a mixture of 190.85 parts of a 3:1 xylene-butanol mixture, 9.15 parts of triethylamine, 100 parts of butyl acrylate, 83.5 parts of methyl methacrylate, 10 parts of 2-isopropenyl-$\Delta^2$-oxazoline, 6.5 parts of acrylic acid and 4 parts of azodiisobutyric acid nitrile for 6 hours at 75° under nitrogen to obtain a clear solution:

Conversion: 100%
Viscosity of the 40% solution thereof: 270 centipoises
Nitrogen content: 0.62%.

Admix 200 parts of this polymer solution, 60 parts of titanium dioxide and 140 parts of a 3:1 xylene-butanol mixture to produce a varnish. Apply the varnish to glass and sheet metal plates and bake same at 130° and 180°, respectively, for 30 minutes. The resultant coatings exhibit a good resistance against solvents as well as good adhesion; they have pendulum hardnesses, at a coating thickness of 30 to 40 $\mu$, of 139 and 149 seconds, respectively, as well as Erichsen depression (cupping) values of 9.7 and 8.3 mm., respectively.

Replacing the 2-isopropenyl-$\Delta^2$-oxazoline with an equivalent of either 2-vinyl-4-methyl-$\Delta^2$-oxazoline or 2-vinyl-4,4-dimethyl-$\Delta^2$-oxazoline results, in similar manner, in linear polymerizates and cured coatings having comparable properties.

EXAMPLE 5

Heat a mixture of 181.7 parts of a 3:1 xylene-butanol mixture, 18.3 parts of triethylamine, 100 parts of butyl acrylate, 67 parts of methyl methacrylate, 20 parts of 2-isopropenyl-$\Delta^2$-oxazoline, 13 parts of acrylic acid and 4 parts of azodiisobutyric acid nitrile for 6 hours at 75° under a nitrogen atmosphere to obtain a clear solution:

Conversion: 100%
Viscosity of the 40% solution: 500 centipoises
Nitrogen content: 1.55%.

From this polymer solution—as set forth in Example 4—films are produced exhibiting, in addition to excellent solvent resistance and adhesive strength, pendulum hardness values of 155 and 154 seconds, respectively, and Erichsen cupping values of 8.8 and 6.6 mm., respectively.

Replacing the 2-isopropenyl-$\Delta^2$-oxazoline with an equivalent of either 2'-isopropenyl-spiro(cyclohexane-1,4'-oxazoline) or 2'-vinyl-spiro(cyclohexane-1,4'-oxazoline) results, in similar manner, in linear polymerizates and cured films having comparable properties. (The spiro oxazolines are prepared in accord with Examples 13 and 14 of U.S. Pat. No. 2,831,858.)

EXAMPLE 6

Add dropwise within a period of three hours a mixture of 100 parts of methyl methacrylate, 75 parts of butyl acrylate, 15 parts of 2-isopropenyl-$\Delta^2$-oxazoline and 10 parts of acrylic acid into a mixture, at 75°, of 186 parts of isopropanol, 14 parts of triethylamine and 4 parts of azodiisobutyric acid nitrile. Thereafter, maintain the temperature for another 5 hours at 75° to obtain a clear solution:

Conversion: 100%
Viscosity of the 40% solution: 600 centipoises
Nitrogen content: 1.41%.

Varnish 1.—From 200 parts of this polymer solution, 60 parts of titanium dioxide and 140 parts of xylene, a varnish is produced which is applied to glass and sheet metal plates and baked for 30 minutes at 130° and 180°, respectively. The thus-produced films exhibit very good resistance against solvents and very good adhesive strength; they have pendulum hardness values of 139 and 159 seconds, respectively, and Erichsen cupping values of 8.0 and 6.5 mm., respectively.

Varnish 2.—From 200 parts of this polymer solution, 60 parts of titanium dioxide, and 274 parts of water, a varnish is produced which is applied to glass and sheet metal plates and baked for 30 minutes at 130° and 180°, respectively. The thus-obtained coatings likewise exhibit very good resistance against solvents and very good adhesive strengths; they have pendulum hardness properties of 147 and 163 seconds, respectively, and Erichsen cupping values of 8.0 and 6.6 mm., respectively.

Replacing the 2-isopropenyl-$\Delta^2$-oxazoline with an equivalent of either 2'-vinyl-spiro(cyclopentane-1,4'-oxazoline) or 2-(but-1'-en-2'-yl)-4-methyl-$\Delta^2$-oxazoline results, in similar manner, in linear polymerizates, varnishes and coatings having comparable properties.

EXAMPLE 7

Introduce dropwise, within a period of three hours, a mixture of 100 parts of methyl methacrylate, 75 parts of butyl acrylate, 15 parts of 2-isopropenyl-$\Delta^2$-oxazoline and 10 parts of acrylic acid into a mixture (at 75°) of 193 parts of isopropanol, 7 parts of triethylamine and 4 parts of azodiisobutyric acid nitrile. Thereafter, maintain the temperature at 75° for another 5 hours to obtain a clear solution:

Conversion: 100%
Viscosity of the 40% solution: 786 centipoises
Nitrogen content: 1.48%.

Coatings produced from this polymer solution under the same conditions as set forth in Example 6 exhibit the same properties as the films of Example 6.

EXAMPLES 8–12

In each particular instance, add dropwise and within a period of three hours a mixture of 100 parts of methyl methacrylate, 74 parts of butyl acrylate, 15 parts of 2-isopropenyl-$\Delta^2$-oxazoline and 11 parts of acrylic acid to a mixture (heated at 75°) containing 4 parts of azodiisobutyric acid nitrile, varying amounts of isopropanol and varying quantities of different amines; the amount and the type of the varied components of the mixture are set out in the following table:

| Example | Parts by weight of isopropanol | Parts by weight of amine | Type of amine |
|---|---|---|---|
| 8 | 183 | 17 | Triethylamine. |
| 9 | 188 | 12 | Concentrated amonia. |
| 10 | 184 | 16 | Cyclohexylamine. |
| 11 | 186 | 14 | Piperidine. |
| 12 | 181 | 19 | N,N-dimethylaniline. |

In all polymerization processes, clear solutions are obtained. By mixing, respectively, 200 parts of these solutions, 60 parts of titanium dioxide and 197 parts of isopropanol, varnishes are produced. The latter are applied to glass and sheet metal plates and baked for 30 minutes at 130° and 180°, respectively. The properties of the coatings are identical, within the margin of error. All coatings exhibit very good solvent resistance and adhesive strength; the pendulum hardnesses range between 147 and 152 seconds, and 154 and 160 seconds, respectively; the Erichsen cupping values range between 8.0 and 8.4 mm., and 6.6 and 7.0 mm., respectively.

EXAMPLE 13

Add dropwise within three hours a mixture of 100 parts of styrene, 75 parts of butyl acrylate, 15 parts of 2-isopropenyl-$\Delta^2$-oxazoline and 10 parts of acrylic acid to a mixture (heated at 75°) of 186 parts of isopropanol, 14 parts of triethylamine and 4 parts of azodiisobutyric acid nitrile. Maintain the temperature for another 9 hours at 75°, and after 6 hours of reaction time, add another 4 parts of azodiisobutyric acid nitrile. A clear solution is obtained:

Conversion: 98.2%
Viscosity of the 40% solution: 92 centiposes
Nitrogen content: 1.26%.

Prepare a varnish from 200 parts of this polymer solution, 60 parts of titanium dioxide and 140 parts of xylene. Apply the varnish to glass and sheet metal plates and bake for 30 minutes at 130° and 180°, respectively. The thus-produced films exhibit good solvent resistance and adhesive strength; they have pendulum hardnesses of 165 and 168 seconds, respectively, and Erichsen cupping values of 9.1 and 8.2 mm., respectively.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:
1. A composition consisting essentially of an uncrosslinked random, addition-type copolymer of
(a) a 2-(lower alkenyl)-$\Delta^2$-oxazoline and (b) $\alpha,\beta$-unsaturated carboxylic acid; together with (c) a member selected from the group consisting of ammonia and a volatile amine, the amount of (c) being sufficient to maintain the composition free from cross-liking during free radical addition type polymerization of (a) and (b), said sufficient amount being about at least 0.5 mol of amine per mol of said $\alpha,\beta$-unsaturated carboxylic acid.

2. Composition according to claim 1 wherein the oxazoline is a member selected from the group consisting of 2-vinyl-$\Delta^2$-oxazoline and 2-[1'-(lower) alkyl]-vinyl-$\Delta^2$-oxazoline.

3. A composition according to claim 1 wherein each of component (a) and component (c) is present in an amount approximately equivalent to the number of carboxyl groups in the composition.

4. A composition as defined by claim 1, said addition type copolymer being of (a) 2 to 20 percent by weight of a 2-(lower alkenyl)-$\Delta^2$-oxazoline, (b) from 1.5 to 15 percent by weight of $\alpha,\beta$-unsaturated carboxylic acid, and (c) from 0 to 85 percent by weight of ethylenically unsaturated free radical addition polymerizable comonomer, said composition containing from 1.5 to 20 percent by weight of said member selected from the group consisting of ammonia and a volatile amine.

5. A composition as defined by claim 4, said addition-type copolymer being of 5 to 15% by weight of component (a) and at least an equivalent amount of component (b), component (a) being a member selected from the group consisting of 2-vinyl-$\Delta^2$-oxazoline, 2-isopropenyl-$\Delta^2$-oxazoline and 2-(but-1'-en-2'-yl)-$\Delta^2$-oxazoline.

6. A varnish solution containing a composition as defined by claim 1.

7. A process for addition polymerizing at 60–100° C., a 2-(lower alkenyl)-$\Delta^2$-oxazoline with $\alpha,\beta$-unsaturated carboxylic acid in a medium containing a free radical catalyst and a member selected from the group consisting of ammonia and volatile amine, said member being present in sufficient quantities to prevent crosslinking of resultant addition polymerized chains during said addition polymerizing process, said sufficient amount being about at least 0.5° mol of amine per mol of said $\alpha,\beta$-unsaturated carboxylic acid.

8. A process as defined by claim 7, comprising the further steps of applying resultant addition polymerizate to a substrate to form a film thereon, and then baking said film on said substrate at a temperature of 100–200° C. for a period of 15–60 minutes.

References Cited

UNITED STATES PATENTS

| 2,120,933 | 6/1938 | Dittmar | 260—2 |
| 2,831,858 | 4/1958 | de Benneville et al. I | 260—244 |
| 2,897,182 | 7/1959 | de Benneville et al. II | 260—85.5 |

JOSEPH L. SCHAFER, Primary Examiner

STANFORD M. LEVIN, Assistant Examiner

U.S. Cl. X.R.

117—124, 127; 260—29.6, 32.8, 33.4, 33.6, 41, 80.3, 80.72

UNITED STATES PATENT OFFICE
CERTIFICATE OF CORRECTION

Patent No. 3,535,291                    Dated October 20, 1970

Inventor(s) Franz Riemhofer et al

It is certified that error appears in the above-identified patent and that said Letters Patent are hereby corrected as shown below:

Col. 1, line 6-7, please delete "by mesne assignments, to Chemetron Corporation, Chicago, Ill., a corporation of Delaware" and insert the following therefor: ---Chemische Werke Huels A. G., 4370 Marl, Germany---.

Signed and sealed this 13th day of June 1972.

(SEAL)
Attest:

EDWARD M. FLETCHER, JR.                 ROBERT GOTTSCHALK
Attesting Officer                       Commissioner of Patents